United States Patent Office 3,183,097
Patented May 11, 1965

---

3,183,097
PROCESS FOR TENDERIZING MEAT
Bela Federics, 477 Notre Dame Ave., Sudbury,
Ontario, Canada
No Drawing. Filed Sept. 27, 1962, Ser. No. 226,746
9 Claims. (Cl. 99—107)

This application is a continuation-in-part of my application Serial Number 92,785, filed March 2, 1961, for Process for Tenderizing Meat, now abandoned. This invention relates to a process for the tenderizing of meat.

More particularly, this invention relates to meat tenderizing processes which not only tenderize the meat, but at the same time can be practised in such a manner that the shrinkage of the meat is reduced very substantially.

Processes embodying my invention are applicable to ham, bacon, corned beef, pastrami, ham sausage, Polish sausage, emulsion products (bologna, weiners and loaves), and poultry. It must be understood, therefore, that where herein I use the term "meat," this is to be interpreted in the limited sense as encompassing only ham, bacon, corned beef, pastrami, ham sausage, Polish sausage, emulsion products (as previously defined) and poultry, and nothing else.

An important object of my invention is to provide new and useful meat tenderizing processes.

Another object of my invention is to provide meat tenderizing processes which can be practised in such a manner that meat shrinkage during cooking is reduced very substantially.

A further object of my invention is to provide meat tenderizing processes which make possible the adoption of lower cooking or smoking temperatures than has hitherto generally been the case.

Yet another object of my invention is to provide meat tenderizing processes which, because it makes possible the adoption of lower cooking or smoking temperatures than has hiterto generally been the case, accelerate the cooking or smoking of the meat.

An important object of my invention is to provide processes which tenderize meat, reduce meat shrinkage during cooking very substantially, make possible the adoption of lower cooking or smoking temperatures than has hitherto generally been the case and accelerate the cooking or smoking of the meat.

My invention is based on the new and unexpected discovery that powdered mesenteric lymph glands, pancreatic glands, or mixtures thereof may be used to achieve the foregoing objects.

Mesenteric lymph glands which are used in practising my invention preferably are those which are derived from animals which give beef, pork, veal or lamb. These glands are placed around the casings of the bowels of these animals and serve as purifiers, all the blood of the animals passing through these glands to be purified. Mesenteric lymph glands suitable for use in practising my invention may be prepared by placing the glands in a glass or stainless steel container, covering the glands with acetone, changing the acetone two or three times in an hour, after about one hour removing the glands from the acetone, drying them, and finally pulverizing the glands to a fine powder.

Pancreatic glands are well known in the art. The ones used in practising my invention preferably are those which are derived from animals which give beef, pork, veal or lamb. Powdered pancreatic glands prepared in a known manner and suitable for use in practising my invention are sold under the trade name "R.S.R. Digestor," the latter being a mixture of "Rapidase" and "Serizyme" (trade marks).

In brief, one meat tenderizing process embodying my invention comprises distributing throughout meat from about 0.06 to about 0.75 ounce of powdered pancreatic glands or from about 0.03 to about 0.38 ounce of powdered mesenteric lymph glands per 100 pounds of meat, and heating the meat to an internal temperature greater than about 110° C., the meat being heated for a time sufficient to cook the same. Where the meat is ham, bacon, corned beef or pastrami, the meat is cured before heating. If desired, the meat may be smoked while it is cooking.

Other objects and advantages of my invention will become apparent from the following detailed disclosure.

My invention will be first described in connection with the processing of ham, which, it will be understood, is the generic terminology for boneless hams, bone-in-hams, picnic hams and cottage rolls. In accordance with my process, I prepare an aqueous solution consisting of from about 0.5 ounce of powdered pancreatic glands (or about 0.25 ounce of powdered mesenteric lymph glands) per 2 gallons of brine to the same quantity of mesenteric lymph glands or pancreatic glands per 16 gallons of brine. This solution is injected into the ham by known methods, such as arterial pumping, and is distributed throughout the ham. Using the aforementioned proportions of glands to solution, I pump into the ham 10% of its weight of solution. Generalizing, however, I have found that my process may be practised in the range of from about 0.06 ounce of powdered pancreatic glands to about 0.5 ounce of powdered pancreatic glands per 100 pounds of ham. The corresponding range for mesenteric lymph glands is from about 0.03 ounce to about 0.25 ounce. Preferably, based on 10% pumping, I use 0.5 ounce of powdered pancreatic glands or 0.25 ounce of powdered mesenteric lymph glands per 4 gallons of brine. This works out to a preferable figure of about 0.1 ounce of powdered pancreatic glands (or 0.05 ounce of powdered mesenteric lymph glands) per 100 pounds of ham. The ham is then cured. This is a conventional process well known in the art. The ham may be subjected to a fast cure or a slow cure, the latter varying in length, although seven days is acceptable. Conventional curing baths consist of brine, ascorbic acid, sugar, sodium nitrite and sodium nitrate. After curing, the ham is heated to an internal temperature greater than 110° C., at which temperature the action of meat tenderizing commences, the ham being cooked while its internal temperature is so raised. If desired, the ham may be smoked while it is cooking.

I have found that if the internal temperature of the ham is raised to about 140° C., not only will the ham be cooked, but also the shrinkage of the ham will be negligible. It may be necessary, however, to raise the internal temperature of the ham above 140° C., if the pure food and drug laws under which the smoke-house operates so require. I have found, however, that even at higher temperatures than 140° C., the shrinkage of hams treated in accordance with my process is considerably less than those not so processed.

While meat tenderizing commences in accordance with my process at 110° C., generally, in order to satisfy pure food and drug laws, the meat must be cooked at a higher temperature. Where trichinosis must be killed, the internal cooking temperature of the meat must be greater than 127° C. The upper temperature limit is dictated in part by pure food and drug laws and in part by economics, a compromise being effected between temperature and shrinkage. As aforementioned, I have found 140° C. to be a most suitable internal cooking temperature for ham. This is a lower cooking temperature than is normally used, and the ham can be raised to this temperature more quickly than to a higher temperature, thereby making for a faster process. At the same time I have found that ham shrinkage at this temperature is virtually nil.

Bacon, which is the generic terminology for side bacon and back bacon, may be treated in the same manner as ham, the side bacon being cooked preferably to a temperature of 127° C., while the back bacon is cooked to a temperature of 140° C. Again, pure food and drug laws may make it necessary to raise the internal temperature of the bacon above these aforementioned figures.

Corned beef and pastrami may be treated as in the case of ham, but at cooking temperatures of about 150° C.

In the case of meats which are used to produce ham sausage and Polish sausage, these meats being in relatively fine form, I thoroughly mix from about 0.5 to 0.75 ounce of powdered pancreatic glands or from 0.25 to about 0.38 ounce of powdered mesenteric lymph glands per 100 pounds of Polish sausage or ham sausage meat, preferably 0.5 ounce of powdered pancreatic glands (0.25 ounce of powdered mesenteric lymph glands) per one hundred pounds of ham sausage or Polish sausage meat. When meat so treated is cooked at a temperature greater than 110° C., meat tenderizing commences. This meat may be cured prior to cooking and also may be smoked during cooking.

In the case of emulsion products (bologna, weiners and loaves), I mix with the chopped meats used to make the same from one-eighth to one-half ounce, preferably one-half ounce, of powdered pancreatic glands per 100 pounds of the meats used to make up the emulsion products. Half this amount of mesenteric lymph glands may be employed instead. Emulsion products so treated are then processed conventionally. I have found, in the case of emulsion products, that the process of my invention does not appreciably affect shrinkage. It does have an appreciable tenderizing effect, however, after the emulsion products have been cooked to a temperature greater than 110° C.

Poultry may be treated in accordance with my invention by submerging the poultry in a brine solution which contains from one-half ounce of powdered pancreatic glands per 8 gallons of brine to one-half ounce per 2 gallons of brine or half this amount of powdered mesenteric lymph glands. Preferably a solution containing one-half ounce of powdered pancreatic glands or 0.25 ounce of powdered mesenteric lymph glands per 4 gallons of brine is employed. The brine may have a salometer reading of 45, for example, and the poultry may be submerged therein for 48 hours, for example. When the poultry is removed from the brine tank, it is placed in a smoke house and heated to an internal temperature greater than 110° C., preferably about 140° C., to cook the poultry. Tenderizing commences at about 110° C. The aqueous solution of glands also may be injected into the bird by spray pumping, another technique known in the art.

It should be noted that while I have indicated a range within which my process may be practised successfully, it is desirable that my process be practised employing about the amounts of mesenteric lymph glands or pancreatic glands that I have indicated as preferable. The use of less than the correct amount of glands will result in an ineffective process, while the use of more than the correct amount may impart a bitter taste to the meat. It will be appreciated, of course, that mixtures of powdered pancreatic glands and mesenteric lymph glands may be used in practising my invention. Where herein I refer to "effective mixtures" of pancreatic and mesenteric lymph glands, I mean mixtures of such proportions that the effects thereof are the same as amounts of either pancreatic glands or mesenteric lymph glands alone which are within the limits set out in the claim in which these words appear and on the basis of one ounce of mesenteric lymph glands being equal to two ounces of pancreatic glands. Thus 0.06 ounce of pancreatic glands is equivalent to 0.03 ounce of mesenteric lymph glands in effect and correspecting "effective mixtures" could be 0.02 ounce of mesenteric lymph glands and 0.02 ounce of pancreatic glands or 0.01 ounce of mesenteric lymph glands and 0.04 ounce of pancreatic glands, for example.

It is to be understood that the term "gallons" as used herein refers to imperial measure and that the term "cooking temperature" refers to the internal temperature of the meat.

Those skilled in the art will realize that various changes and modifications of my invention may be made from the preferred embodiments of my invention disclosed herein without departing from the spirit and scope of my invention as defined in the appended claims.

What I claim as my invention is:

1. A process for tenderizing meat which comprises distributing evenly throughout the meat a powdered material selected from the class consisting of pancreatic glands in the proportion of from about 0.06 to about 0.75 ounce per 100 pounds of meat, mesenteric lymph glands in the proportion of from about 0.03 to about 0.38 ounce per 100 pounds of meat and effective mixtures of pancreatic glands and mesenteric lymph glands, and heating the meat to an internal temperature greater than about 110° C., the meat being heated for a time sufficient to cook the meat.

2. A process for tenderizing meat which comprises distributing evenly throughout the meat an aqueous solution containing material selected from the class consisting of pancreatic glands in the proportion of from about 0.06 to about 0.75 ounce per 100 pounds of meat, mesenteric lymph glands in the proportion of from about 0.03 to about 0.38 ounce per 100 pounds of meat and effective mixtures of pancreatic glands and mesenteric lymph glands, curing the meat, and heating the meat to an internal temperature greater than about 110° C., the meat being heated for a time sufficient to cook the meat.

3. A process for tenderizing ham which comprises distributing evenly throughout the ham an aqueous solution containing material selected from the class consisting of pancreatic glands in the proportion of from about 0.06 to about 0.5 ounce per 100 pounds of ham, mesenteric lymph glands in the proportion of from about 0.03 to about 0.25 ounce per 100 pounds of ham and effective mixtures of pancreatic glands and mesenteric lymph glands, curing the ham, and heating the ham to an internal temperature greater than about 110° C., the ham being heated for a time sufficient to cook the ham.

4. A process for tenderizing bacon which comprises distributing evenly throughout the bacon an aqueous solution containing material selected from the class consisting of pancreatic glands in the proportion of from about 0.06 to about 0.5 ounce per 100 pounds of bacon, mesenteric lymph glands in the proportion of from about 0.03 to about 0.25 ounce per 100 pounds of bacon and effective mixtures of pancreatic glands and mesenteric lymph glands, curing the bacon, and heating the bacon to an internal temperature greater than about 110° C., the bacon being heated for a time sufficient to cook the bacon.

5. A process for tenderizing corned beef which comprises distributing evenly throughout the corned beef an aqueous solution containing material selected from the class consisting of pancreatic glands in the proportion of from about 0.06 to about 0.5 ounce per 100 pounds of corned beef, mesenteric lymph glands in the proportion of from about 0.03 to about 0.25 ounce per 100 pounds of corned beef and effective mixtures of pancreatic glands and mesenteric lymph glands, curing the corned beef, and heating the corned beef to an internal temperature greater than about 110° C., the corned beef being heated for a time sufficient to cook the corned beef.

6. A process for tenderizing pastrami which comprises distributing evenly throughout the pastrami an aqueous solution containing material selected from the class consisting of pancreatic glands in the proportion of from about 0.06 to about 0.5 ounce per 100 pounds of pastrami, mesenteric lymph glands in the proportion of from about 0.03 to about 0.25 ounce per 100 pounds of pastrami and effective mixtures of pancreatic glands and mesenteric lymph glands, curing the pastrami, and heating the pastrami to an internal temperature greater than about 110° C., the pastrami being heated for a time sufficient to cook the pastrami.

7. A process for tenderizing ham sausage meat which comprises distributing evenly throughout the ham sausage meat an aqueous solution containing material selected from the class consisting of pancreatic glands in the proportion of from about 0.5 to about 0.75 ounce per 100 pounds of ham sausage meat, mesenteric lymph glands in the proportion of from about 0.25 to about 0.38 ounce per 100 pounds of ham sausage meat and effective mixtures of pancreatic glands and mesenteric lymph glands, curing the ham sausage meat, and heating the ham sausage meat to an internal temperature greater than about 110° C., the ham sausage meat being heated for a time sufficient to cook the ham sausage meat.

8. A process for tenderizing Polish sausage meat which comprises distributing evenly throughout the Polish sausage meat an aqueous solution containing material selected from the class consisting of pancreatic glands in the proportion of from about 0.5 to about 0.75 ounce per 100 pounds of Polish sausage meat, mesenteric lymph glands in the proportion of from about 0.25 to about 0.38 ounce per 100 pounds of Polish sausage meat and effective mixtures of pancreatic glands and mesenteric lymph glands, curing the Polish sausage meat, and heating the Polish sausage meat to an internal temperature greater than about 110° C., the Polish sausage meat being heated for a time sufficient to cook the Polish sausage meat.

9. A process for tenderizing meat which comprises distributing evenly throughout the meat an aqueous solution containing a material selected from the class consisting of pancreatic glands in the proportion of from about 0.5 ounce to between about 2 to 16 gallons of said solution, mesenteric lymph glands in the proportion of from about 0.5 ounce to between about 2 to 16 gallons of said solution, and effective mixtures of pancreatic glands and mesenteric lymph glands, and heating the meat to an internal temperature greater than about 110° C., the meat being heated for a time sufficient to cook the meat.

References Cited by the Examiner
UNITED STATES PATENTS

| | | | |
|---|---|---|---|
| 2,355,548 | 8/44 | Musher. | |
| 2,418,914 | 4/47 | Tichy | 99—107 |
| 2,539,544 | 1/51 | Levin et al. | 99—208 |
| 2,825,654 | 3/58 | Vaupel | 99—107 X |
| 2,918,374 | 12/59 | Fresch | 99—107 |
| 3,033,687 | 5/62 | Harper et al. | 99—159 X |
| 3,075,843 | 1/63 | Maas et al. | 99—159 X |

A. LOUIS MONACELL, *Primary Examiner.*

HYMAN LORD, *Examiner.*